United States Patent
Willis

(10) Patent No.: US 7,379,123 B2
(45) Date of Patent: May 27, 2008

(54) SEQUENTIAL DISPLAY SYSTEM WITH CHANGING COLOR ORDER

(75) Inventor: Donald Henry Willis, Indianapolis, IN (US)

(73) Assignee: Thomson Licensing, Boulogne Billancourt (FR)

( * ) Notice: Subject to any disclaimer, the term of this patent is extended or adjusted under 35 U.S.C. 154(b) by 559 days.

(21) Appl. No.: 10/535,320

(22) PCT Filed: Jul. 3, 2003

(86) PCT No.: PCT/US03/21040

§ 371 (c)(1),
(2), (4) Date: May 18, 2005

(87) PCT Pub. No.: WO2004/049691

PCT Pub. Date: Jun. 10, 2004

(65) Prior Publication Data

US 2006/0050185 A1    Mar. 9, 2006

Related U.S. Application Data

(60) Provisional application No. 60/427,859, filed on Nov. 20, 2002.

(51) Int. Cl.
*H04N 5/74* (2006.01)
*G09G 3/36* (2006.01)

(52) U.S. Cl. ............................ 348/742; 345/85

(58) Field of Classification Search ................ 348/742, 348/743, 744, 759, 755, 771; 345/84, 85; 353/84, 20
See application file for complete search history.

(56) References Cited

U.S. PATENT DOCUMENTS

| | | | |
|---|---|---|---|
| 4,399,455 A | | 8/1983 | Alvarez |
| 5,777,589 A | * | 7/1998 | Gale et al. ................ 345/84 |
| 5,909,204 A | * | 6/1999 | Gale et al. ................ 345/85 |
| 5,984,478 A | * | 11/1999 | Doany et al. .............. 353/84 |

(Continued)

FOREIGN PATENT DOCUMENTS

EP    0662773    7/1995

(Continued)

OTHER PUBLICATIONS

EP Search Report dated May 31, 2006.

(Continued)

*Primary Examiner*—Paulos M. Natnael
(74) *Attorney, Agent, or Firm*—Joseph J. Laks; Harvey D. Fried; Patricia Verlangieri

(57) ABSTRACT

To sequentially display pictures in a television signal, a first picture is separated into sets of red, green and blue segments, with each segment of each color interleaved with the segments of the other colors in a first sequence for display in that sequence. Each successive picture is likewise separated into sets of red, green and blue segments, which each segment of each color interleaved with the segments of the other colors in a shifted sequence for display in that sequence. Shifting the color sequence of the segments of each successive picture among the primary colors so at least the first and last segment of the occurrence of motion artifacts that manifest themselves as a color distortion at the leading and trailing edges of a moving object followed by a viewer's eye.

11 Claims, 1 Drawing Sheet

U.S. PATENT DOCUMENTS

| | | |
|---|---|---|
| 6,369,832 B1 | 4/2002 | McKnight |
| 6,453,067 B1 | 9/2002 | Morgan et al. |
| 6,962,414 B2 * | 11/2005 | Roth ............................ 353/20 |
| 7,042,527 B2 * | 5/2006 | Imai ............................ 348/742 |
| 7,077,524 B2 * | 7/2006 | Roth ............................ 353/20 |
| 2002/0054031 A1 | 5/2002 | Elliott et al. |
| 2002/0109821 A1 | 8/2002 | Huibers et al. |

FOREIGN PATENT DOCUMENTS

| | | |
|---|---|---|
| EP | 0812508 | 12/1997 |

OTHER PUBLICATIONS

Search Report Dated Apr. 30, 2004.

* cited by examiner

SEQUENTIAL DISPLAY SYSTEM WITH CHANGING COLOR ORDER

CROSS REFERENCE TO RELATED APPLICATION

This application claims the benefit, under 35 U.S.C. § 365 of International Application PCT/US03/21040, filed Jul. 3, 2003, which was published in accordance with PCT Article 21(2) on Jun. 10, 2004 in English and which claims the benefit of U.S. provisional patent application No. 60/427,859, filed Nov. 20, 2002.

TECHNICAL FIELD

This invention relates to a technique that reduces motion artifacts that manifest themselves in a sequential display system.

BACKGROUND ART

Present-day sequential display systems typically comprise a light source that illuminates a light modulator that has the capability of controlling the illumination of each of a plurality of picture elements (pixels) projected onto a display. A controller controls the light modulator in response to an input television signal so that the light modulator will display successive pictures in the television signal, each picture appearing during a corresponding picture interval. The length of the picture interval depends on the selected television standard. The NTSC standard currently in use in the United States prescribes a picture interval of 1/60 second whereas certain European television standards (e.g., PAL) prescribe a picture interval of 1/50 second.

A typical sequential display system achieves a color display by sequentially projecting red, green, and blue light onto the light modulator during each picture interval. Many sequential display systems utilize a motor-driven color wheel interposed in the light path of the light modulator to accomplish this task. The color wheel has at least one set of primary color windows (typically red, green and blue) so that upon rotation of the color wheel, red, green, and blue light illuminate the light modulator. (Most present day color wheels have multiple sets of primary color windows.) In practice, each color is broken up into an integer number of segments, with the segments of each color interleaved with the segments of the other colors in time, thereby shortening the interval between colors to reduce the problem of color break up with motion.

Separating the picture into sets of primary color segments usually incurs the disadvantage that a moving white object will suffer color distortion (i.e., motion artifacts) at its leading and trailing edges. In each new picture, the leading edge will have the same primary color say red, while the trailing edge will always have another primary color, say green, as the preceding picture. Usually, this problem is slightly reduced but not eliminated, by increasing the number of primary color segments per picture to minimize the visibility of the colors at the leading and trailing edges of the object. However, most sequential display systems limit the number of primary color segments per picture.

Thus, there is need for a technique for minimizing such motion artifacts in a sequential display system.

BRIEF SUMMARY OF THE INVENTION

Briefly, in accordance with the present principles, there is provided a technique for displaying at least a first and a second picture in sequence with reduced motion artifacts. The method commences by separating the first picture into sets of first picture segments, each set associated with a different primary color (e.g., red, green and blue). Thus, for example, the first picture is separated into an integer number of red segments, green segments and blue segments. The red, green and blue segments comprising the first picture are interleaved in a first color sequence. The second picture is likewise separated into sets of segments, each set associated with a different primary color. The segments of the second picture are interleaved in a color sequence different than the color sequence of the segments of the first picture so at least the first and last segments of the second picture are each of different color than the first and last segments, respectively, of the first picture. The segments of the first picture are displayed in their color sequence followed by a display of the segments of the second picture in their color sequence. Shifting the color sequence of the segments of each successive picture among the primary colors serves to reduce the occurrence of motion artifacts that manifest themselves as a color distortion at the leading and trailing edges of a moving object followed by a viewer's eye.

DETAILED DESCRIPTION

Figure 1:
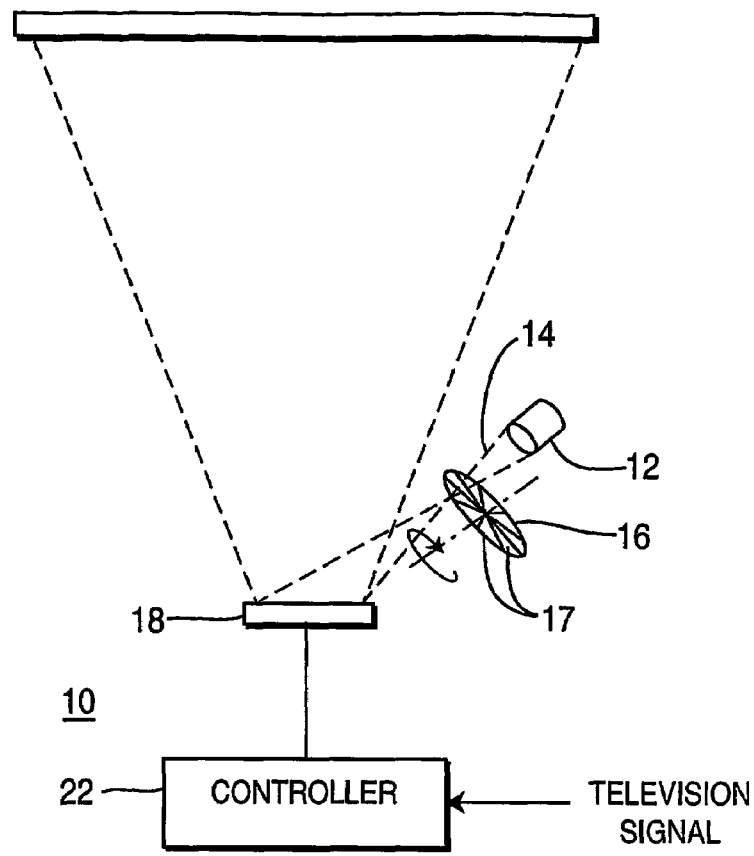
FIG. 1 depicts a block schematic diagram of an exemplary sequential color display system for illustrating the present principles.

FIG. 1 depicts an exemplary sequential color display system 10 comprising a light source 12 for generating a light beam 14 directed through a rotating color wheel 16 having at least three separate primary color windows 17, e.g., at least one red (R), one green (G) and one blue (B) window. A typical color wheel of according to the prior art has two red, two blue and two green windows interleaved in an RGBRGB sequence. During rotation of the color wheel 16, red, green and blue light successively strike the surface of a light modulator 18 for reflection thereby onto a display screen 20.

A controller 22 controls the operation of the light modulator 18 in accordance with an input television signal containing a sequence of pictures, each picture appearing within a picture interval established in accordance with a prescribed television standard (i.e., 1/60 second for NTSC and 1/50 second for PAL). For each picture, the controller 22 produces control signals causing the light modulator 18 to "generate" sets of picture segments with each set of segments associated with one of the three primary colors (red, green and blue, respectively). The light modulator 18 generates a picture segment by reflecting light (or not reflecting light) from the light source 12, as colored by the color wheel 16, during an interval corresponding to the duration of the segment. In the illustrated embodiment, the controller 22 causes the light modulator 18 to generate four segments for each primary color, for a total of twelve segments per picture (four red, four green and four blue). In practice, the color wheel 16 rotates at an integer number of revolutions during each picture interval, causing each of the segments associated with each primary color to become interleaved with the segments associated with each of the other colors in a color sequence that remains the same from picture to picture.

In response to the control signals from the controller 22, the light modulator 18 selectively reflects the primary color associated with each segment onto the display screen 20 such that the individual picture elements (pixels) in that color have an illumination intensity in accordance with the incoming picture. The primary colors modulated by the light modulator 18 appear in sequence on the display screen 20 to yield a color picture during each picture interval. The sequence of colors corresponds to the color sequence imparted by the rotating color wheel 16. The display system 10 can include one or more lenses, mirrors and/or prisms (not shown) to alter the characteristics of the light striking the light modulator 18 as well as to alter the characteristics of the light displayed on the display screen 20.

In the illustrated embodiment, the light modulator 18 operates to selectively reflect incident light and thus the light modulator can comprise a digital micromirror device (DMD), such as the DMD manufactured by Texas Instruments. Although not depicted in FIG. 1, the light modulator could take the form of a light transmissive device, such as a liquid crystal, for selectively modulating the light for transmission therethrough and onto the display screen. As will be appreciated, the properties of the light modulator 18 are not critical to the present principles.

Present day sequential color display systems, such as system 10 described above, display a moving white object with color distortion at its leading and trailing edges. In practice, the leading edge of such an object will have a first color say red, while the trailing edge will have a different color, say blue. This causes a motion artifact to appear as a viewer's eye tries to follow the moving object. Currently, present day sequential color display systems attempt to ameliorate this type of motion artifact by increasing the number of segments per picture interval although many systems limit the number of segments.

Figure 2:
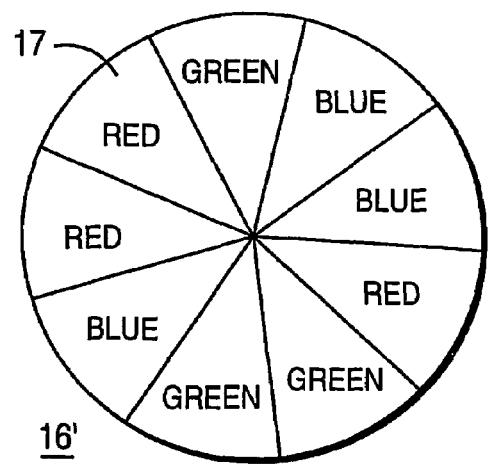
FIG. 2 depicts a first embodiment of a color wheel in accordance with the present principles for use in the display system of FIG. 1.

In accordance with the present principles, the occurrence of color distortion at the leading and trailing edges of a moving white object can be reduced by interchanging the sequence of the primary colors imparted to the light striking the light modulator 18 so that at least the first and last segments of each successive picture have a different primary color than the first and last segments, respectively, of the preceding picture. In the illustrated embodiment, interchanging the color sequence is accomplished by altering the arrangement of the color windows in the color wheel as well as changing the speed at which the color wheel rotates. FIG. 2 depicts a color wheel 16' in accordance with a first preferred embodiment of the invention for interchanging the color sequence. The color wheel 16' has nine color windows 17, with each window having an arc of 40°. As compared to the color wheel 16 of FIG. 1, the color windows 17 in the wheel 16' are arranged in a GBBRGGBRR orientation, starting with the window 17 closest to the 12 O'clock position and proceeding clockwise.

Assuming that a first picture starts with the upper left red window 17 (i.e., the red window at the 10 O'clock position in the color wheel 16' of FIG. 2), the color sequence imparted to the light striking the light modulator 18 of FIG. 1 becomes RGBBRGGBRRGB upon counter-clockwise rotation of the wheel. The color wheel 16' rotates at a non-integer number of revolutions during each picture interval. In the preferred embodiment, the color wheel 16' rotates 1⅓ revolutions per picture interval to establish four red, four green and four blue segments interleaved in a first color sequence. For the next successive picture, the color sequence of the interleaved segments will shift by one color. For example, assume that a first picture has a first segment that is red and a last segment that is blue. A second successive picture will have a first segment that is blue and a last segment that is green. A third successive picture will have a first segment that is green and a last segment that is red. Thus, the arrangement of the color windows 17 in the color wheel 16', in combination with the non-integer number of color wheel rotations per picture interval, causes the color sequence of interleaved segments to shift by one color from picture to picture.

Shifting the color sequence of the interleaved segments by one color from picture to successive picture serves to reduce motion artifacts associated with color distortion of the type described above. As the a viewer's eye follows a moving object, the color of imparted to the first segment of a picture appears as the color of the leading edge of the object because each subsequent segment imprints on the viewer's retina in a location that lags the previously imprinted location. By shifting the color sequence imparted to first segment of each successive new picture, the color of the leading edge of the moving object shifts among red, blue, and green at one-third the picture frequency. Thus the leading edge will tend to have the same color as the original object, thereby virtually eliminating the problem of color distortion.

Figure 3:
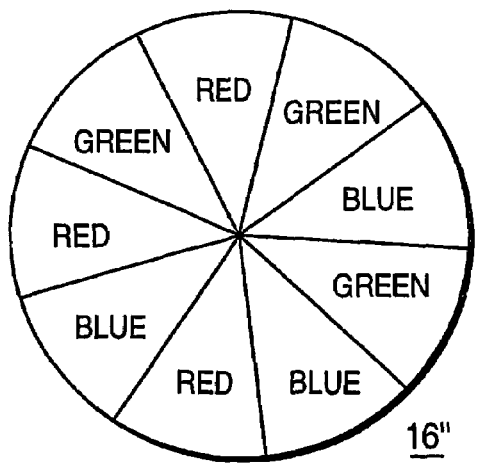
FIG. 3 depicts a second embodiment of a color wheel in accordance with the present principles for use in the display system of FIG. 1.

FIG. 3 shows an alternative embodiment 16" of a color wheel in accordance with the present principles, which when rotated at a non-integer number of revolutions, effects a one-color shift in the color sequence of the interleaved segments for each successive picture. As seen in FIG. 3, the color wheel 16" comprises three red, three green and three blue color windows 17, each having an arc of 40° and arranged in a RGBGBRBRG sequence, commencing with the red window closest to the 12 O'clock position and proceeding clockwise. In operation, the color wheel 16", when substituted for the color wheel 16 of FIG. 1 and rotated at 1⅓ rotations per picture interval, will accomplish a one-color shift in the color sequence of the interleaved segments of each successive picture in a manner comparable to the color wheel 16' of FIG. 2. As compared to the color wheel 16" of FIG. 2, the color wheel 16' affords the advantage of fewer "spokes" (i.e., transitions between colors). The reduced number of spokes in the color wheel 16' of FIG. 2, as compared to the color wheel 16" of FIG. 3, allows for more economical coding of the segments when the light modulator 18 is operated by pulse width modulation.

Other mechanisms besides the color wheels 16' and 16" of FIGS. 2 and 3, respectively, can interchange the sequence of primary colors imparted to the interleaved segments of each successive picture to reduce the motion artifacts associated with color distortion. For example, there exist mechanisms such as liquid crystal displays and the like which sequentially impart each of three primary colors to the light incident on the light modulator 18. The operation of such mechanisms can be altered in accordance with the present principles to sequentially the color sequence imparted to the interleaved segments by one color for each successive picture in the same manner as the color wheels 16' and 16".

It is possible to shift the color sequence imparted to the interleaved segments of each successive picture by one color using a conventional color wheel, such as the color wheel 16 of FIG. 1 rotating at an integer number of revolutions per picture. Simply dropping a different color segment for each successive picture will cause a shift in the color sequence by one color so that the first and last frames of each successive picture will have a different color than the first and last frames, respectively, of a previous picture. Dropping a different color segment per picture however will cause a loss in picture brightness. Therefore, this approach to shifting the color sequence likely will not prove as efficacious as using either of the color wheels 16' or 16" and rotating each wheel a non-integer number of rotations during each picture interval.

It is also possible to shift the color sequence of the segments of each successive picture by one color using a conventional color wheel without any loss of brightness. Such shifting can be accomplished by simply separating the picture into an unequal number of segments, say four red, four blue and three green. The effect of having an unequal number of segments will cause an inherent shift in the color sequence for each new picture. Unfortunately, having such an unequal number of segments requires very sophisticated memory management within the controller 22, rendering this approach impractical.

The foregoing describes a display technique that affords reduced motion artifacts to the human eye following a moving object.

The invention claimed is:

1. A method for displaying at least first and second incoming pictures in sequence, comprising the steps of:
    separating the first picture into sets of first picture segments, each set associated with a different primary color;
    interleaving the first picture segments in a first color sequence;
    separating the second picture into sets of second picture segments, each set associated with a different primary color;
    interleaving the second picture segments in a second color sequence in which at least the first and last second picture segments are each of different color than the first and last first picture segments, respectively, and
    sequentially displaying the first picture segments in the first color sequence; and thereafter
    sequentially displaying the second picture segments in the second color sequence.

2. The method according to claim 1 wherein the second color sequence is shifted by one primary color from the first color sequence.

3. The method according to claim 1 wherein the step of separating the first picture includes the step of imparting to each of the sets of first picture segments a different one of a red, green and blue primary colors.

4. The method according to claim 1 wherein the step of separating the second picture includes the step of imparting to each of the sets of second picture segments a different one of a red, green and blue primary colors.

5. The method according to claim 1 wherein the step of separating the first picture into sets of first picture elements includes the step of dropping a segment of a primary color and wherein the step of separating the second picture into sets second picture elements includes dropping a segment of a different primary color than the segment dropped for the first picture.

6. The method according to claim 1 wherein at least one set of first picture segments associated with a primary color has a different number of segments than a set of first picture segments associated with a different primary color and wherein at least one set of second picture segments associated with a primary color has a different number of segments than a set of second picture segments associated with a different primary color.

7. A method for successively displaying color pictures such that each picture appears during a picture interval, comprising the steps of:
    separating each successive picture into sets of segments, the number of sets of segments corresponding to a prescribed number of primary colors;
    imparting each of the primary colors in a prescribed sequence to a beam of light directed onto a light modulator, said each primary color imparted simultaneously with the application of a control signal to the light modulator causing the light modulator to modulate the segment of the primary color for display on a display screen; and
    changing the sequence of primary colors imparted to the light directed onto the light modulator upon each next successive picture so that the primary color associated with at least a first and a last segment of said each next successive picture differs from the primary color associated with each of the first and last segments, respectively, of a preceding picture.

8. The method according to claim 7 wherein the imparting step comprises the steps of:
    interposing a color wheel having a plurality of red, greed and blue interleaved color windows in the beam of light striking the light modulator so that the beam of light will pass through a color window and onto the light modulator;
    rotating the color wheel at a non-integer number of revolutions per picture interval to impart a prescribed sequence of red, green and blue colors to the light directed onto the light modulator.

9. The method according to claim 7 wherein the changing step includes the step of arranging the color windows in the color wheel such that as the wheel rotates, the sequence of red green and blue colors imparted to the light beam striking the light modulator changes for each picture.

10. A sequential color display system for displaying successive pictures, comprising:
    a light source for producing a light beam;
    a light modulator lying within the optical path of the light beam for modulating the light beam onto a display screen;
    means for separating each successive picture into sets of segments, the number of sets of segments corresponding to a prescribed number of primary colors, and for applying control signals to a light modulator to cause the light modulator to generate said sets of segments such that each segment of a set is interleaved between segments of other sets;
    a color sequencing mechanism interposed between the light source and the light modulator for imparting to the light beam each of the primary colors in a prescribed sequence, said each primary color imparted simultaneously with the application of said each segment to the modulator, the color sequencing mechanism changing the sequence of primary colors imparted to the light directed onto the light modulator upon each next successive picture so that the primary color associated with at least a first and a last segment of said each next successive picture each differs from the primary color associated with each of the first and last segments, respectively, of a preceding picture.

11. The system according to claim 10 wherein the color sequencing mechanism comprises a color wheel having a plurality of color windows arranged to impart a separate one of a red, a green and a blue color to the light directed onto the light modulator upon rotation at a non-integer number of rotations per picture interval.

* * * * *